US011288533B2

(12) United States Patent
Umakanth et al.

(10) Patent No.: US 11,288,533 B2
(45) Date of Patent: Mar. 29, 2022

(54) SYSTEMS AND METHODS FOR IDENTIFYING A SERVICE QUALIFICATION OF A UNIT OF A COMMUNITY

(71) Applicant: Verizon Patent and Licensing Inc., Basking Ridge, NJ (US)

(72) Inventors: Adithya Umakanth, Hyderabad (IN); Ramesh Babu Kare, Hyderabad (IN); Vijay Naykodi, Hyderabad (IN); Adithya vikram raj Garoju, Hyderabad (IN); Ashis Sarkar, Tampa, FL (US); Balagangadhara Thilak Adiboina, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/884,654

(22) Filed: May 27, 2020

(65) Prior Publication Data
US 2021/0374456 A1 Dec. 2, 2021

(51) Int. Cl.
*G06K 9/46* (2006.01)
*G06F 16/29* (2019.01)
*G06F 16/583* (2019.01)
*G06T 7/70* (2017.01)
*G06F 16/587* (2019.01)

(52) U.S. Cl.
CPC .............. *G06K 9/46* (2013.01); *G06F 16/29* (2019.01); *G06F 16/587* (2019.01); *G06F 16/5846* (2019.01); *G06T 7/70* (2017.01); *G06K 2209/01* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 9,753,950 | B2 * | 9/2017 | Schultz | G06F 16/532 |
| 10,405,196 | B1 * | 9/2019 | Chadaga | H04N 5/247 |
| 10,410,090 | B1 * | 9/2019 | Wilczynski | G06K 9/4604 |
| 2009/0002367 | A1 * | 1/2009 | Alexis | H04W 16/18 |
| | | | | 345/419 |
| 2015/0039656 | A1 * | 2/2015 | Mendes | G06Q 10/10 |
| | | | | 707/804 |
| 2018/0075168 | A1 * | 3/2018 | Tiwari | G06T 7/0004 |
| 2018/0211204 | A1 * | 7/2018 | Bruns | G06Q 10/087 |
| 2020/0143212 | A1 * | 5/2020 | Okazaki | G06K 9/6271 |

\* cited by examiner

*Primary Examiner* — Nay A Maung
*Assistant Examiner* — Nicolas James Boyajian

(57) ABSTRACT

A community mapping platform may receive an image that depicts a community layout of a community and may process, using a computer vision model, the image to identify a unit, of the community, that is depicted in the image (e.g., based on identifying a text string and/or a polygon in the image). The community mapping platform may determine sets of community geographical coordinates for a set of reference locations of the community and may map the sets of community geographical coordinates to corresponding reference pixel locations of the image. The community mapping platform may determine, using a geographical information system, unit geographical coordinates of the unit based on the reference pixel locations and may perform an action associated with the unit geographical coordinates.

20 Claims, 11 Drawing Sheets

SYSTEMS AND METHODS FOR IDENTIFYING A SERVICE QUALIFICATION OF A UNIT OF A COMMUNITY

BACKGROUND

A network service (e.g., Internet access) may be provided via a wireless network (e.g., a fifth generation (5G) wireless network) to a customer residing in a home, to multiple customers residing in units (e.g., apartments, condominiums, and/or the like) of a community, and/or the like.

DETAILED DESCRIPTION OF PREFERRED EMBODIMENTS

Figure 1A:
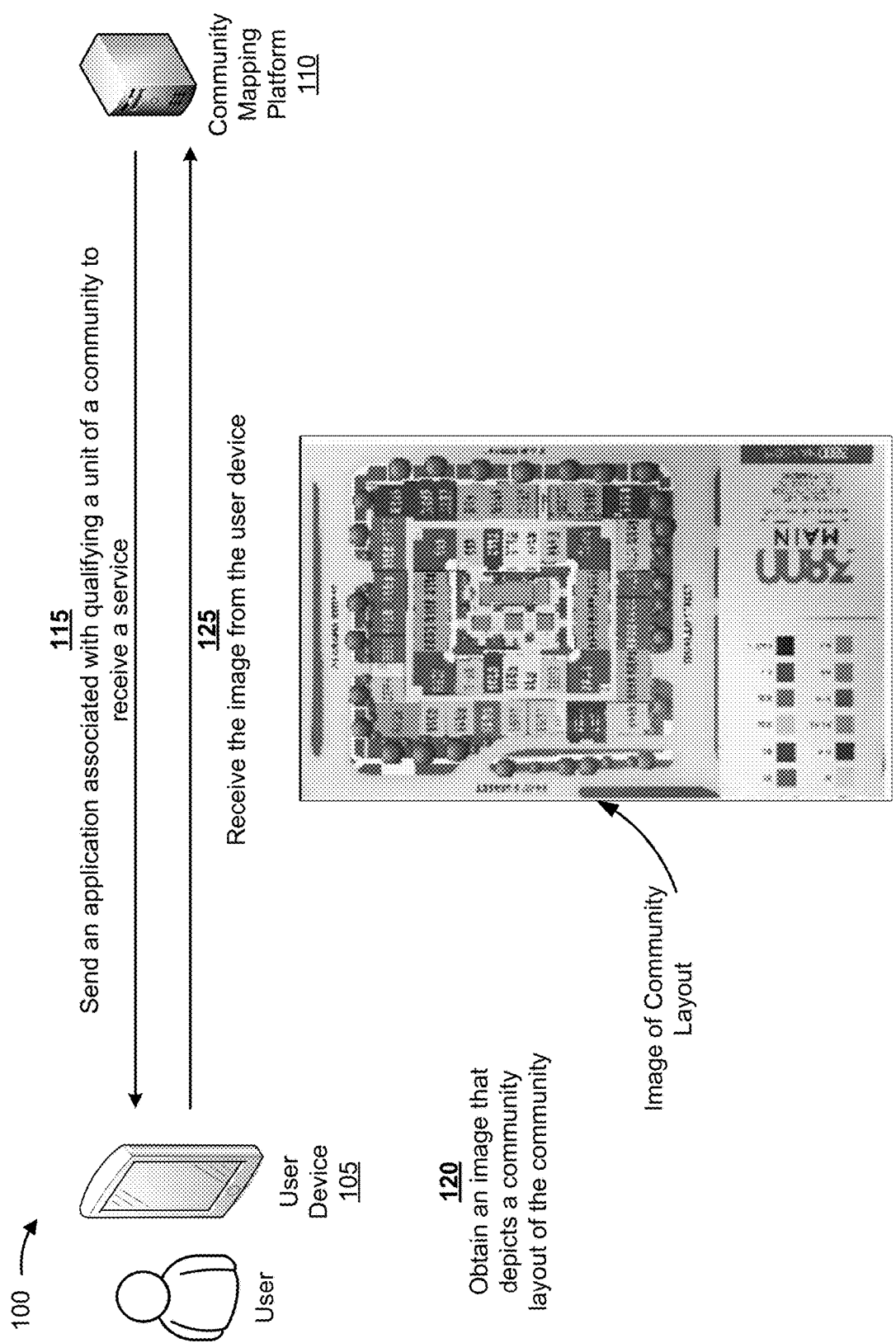
FIGS. 1A-1F are diagrams of one or more example implementations described herein.

The following detailed description of example implementations refers to the accompanying drawings. The same reference numbers in different drawings may identify the same or similar elements.

5G home Internet service is a 5G wireless network service that connects a customer's home with ultra-wide band Internet. Coverage of the wireless network services is an important factor for providing a quality network service, such as ultra-fast Internet to the consumer. Currently, if a customer who lives in a unit of a community (e.g., an apartment unit, a condominium unit, a townhome, and/or the like of the community) desires a network service, the customer provides, to a network provider, a street address of the community. The network provider qualifies the unit for the network service based on a general availability of the network service at the street address. However, this general availability does not necessary mean that a unit will receive good coverage for the network service, or coverage at all due to a location of the unit within the community, and the nature of directional communications for wireless services. This results in false positives (e.g., indicating network coverage) for network service qualifications. Thus, current techniques waste computing resources (e.g., processing resources, memory resources, communication resources, and/or the like), networking resources, human resources in driving out to configure network services in a unit unqualified for network services, and/or the like by incorrectly qualifying wireless network coverage for a network service, correcting the wireless network coverage for the network service, handling customer complaints associated with the network service, and/or the like.

Some implementations described herein provide a community mapping platform that qualifies a unit of a community to receive a network service. In some implementations, the community mapping platform may receive, from a user device, an image that depicts a layout of a community. The community mapping platform may process, using one or more computer vision models, the image to identify text strings (e.g., unit identifiers) and polygons (e.g., unit perimeters) that are depicted in the image. The community mapping platform may determine, based on the positions of the text strings and the positions of the polygons in the image, that a particular text string and a particular polygon are associated with a unit of the community (e.g., that the particular polygon corresponds to a perimeter of the unit and the particular text string corresponds to a unit identifier of the unit).

The community mapping platform may determine sets of geographical coordinates (e.g., sets of latitude and longitude coordinates) for a set of reference locations of the community (e.g., community boundary locations, community landmarks, and/or the like) and may map the sets of geographical coordinates to corresponding reference pixel locations of the image (e.g., corresponding pixel locations of the image that depict the community boundary locations, the community landmarks, and/or the like). The community mapping platform may determine geographical coordinates of the unit (e.g., latitude and longitude coordinates of the unit) based on the reference pixel locations. Based on the unit geographical coordinates and a service coverage mapping, a service qualification metric is determined for the unit (e.g., that indicates a capability of receiving the network service within the unit). The community mapping platform may then perform an action such as provide a notification to the user device that identifies whether the unit is capable of receiving the network service based on the service qualification metric.

In this way, the community mapping platform identifies service qualification of a unit in a community. Thus, the community mapping platform reduces time required to qualify a unit of a community to receive a network service, and conserves computing resources, networking resources, human resources, and/or the like that would otherwise have been used to incorrectly qualify wireless network coverage for a network service, correct the wireless network coverage for the network service, handle customer complaints associated with the network service, and/or the like.

FIGS. 1A-1F are diagrams of one or more example implementations 100 described herein. As shown in FIG. 1A, a user device 105 may be associated with a user (e.g., a technician, a customer, a resident, and/or the like) and a community mapping platform 110. In some implementations, user device 105 may include a mobile device, a computer, a smart phone, and/or the like that the user may utilize to provide information to and/or receive information from community mapping platform 110. Community mapping platform 110 may include a platform that determines whether a service is available for a unit of a community (e.g., an apartment unit, a condominium unit, a townhome, and/or the like, of the community). The community may be comprised of one or more multi-unit buildings (e.g., apartment buildings, condominium buildings, and/or the like) and/or one or more buildings (e.g., attached residences, such as townhomes, rowhomes, and/or the like; unattached residences; and/or the like). The service may include, for example, establishing a local area network via an ultrawide band wireless network (e.g., for a resident of the unit of the community).

As further shown in FIG. 1A, and by reference number 115, community mapping platform 110 may send, to user device 105, an application associated with qualifying the unit of the community to receive the service, as described herein. In some implementations, the user may utilize user device 105 to download the application from community mapping platform 110 or another source, and to install the application. Once user device 105 installs the application, the user may utilize user device 105 to set up the application. For example, the application may request that the user provide credentials (e.g., a user name, a password, an employee identifier, and/or the like) for accessing the application. In some implementations, the application may enable user device 105 to obtain an image of a community layout of the community, as described herein.

As shown in FIG. 1A, and by reference number 120, user device 105 may obtain an image that depicts a community layout of the community (also referred to herein as a "community image"). In some implementations, the user may obtain a physical copy of the community layout (e.g., from a leasing office of the community or from a public record), and may utilize a camera of user device 105 to capture an image of the physical copy of the community layout. For example, the application may cause user device 105 to prompt the user to capture an image of the community layout with the camera of user device 105, and to allow the user to align and capture an image of the community layout. Alternatively, the user may obtain an existing file of an image of the community layout (e.g., from a website associated with the community, via an email from an individual associated with the community, and/or the like). In some implementations, the user may save the image on user device 105 so that the image may be accessible by the application. For example, the user may utilize the application to cause user device 105 to store the image (e.g., as a computer file including image data, metadata, and/or the like) in a data structure (e.g., a database, a table, a list, and/or the like) associated with user device 105.

As shown in FIG. 1A, the image may include at least one text string, at least one polygon, various coloring, various shading, and/or the like to depict the community layout. The community layout may include a layout of units, buildings, streets, communal spaces, pools, green areas, dining areas, fitness or recreational areas, and/or the like associated with the community.

As shown in FIG. 1A, and by reference number 125, user device 105 may provide the image to community mapping platform 110. For example, a user interact with the application via a user interface of user device 105 to cause user device 105 to provide the image to community mapping platform 110 to determine whether the service is available for the unit. The application may cause user device 105 to establish a communication session with community mapping platform 110 and transmit the image to community mapping platform 110.

Figure 1B:
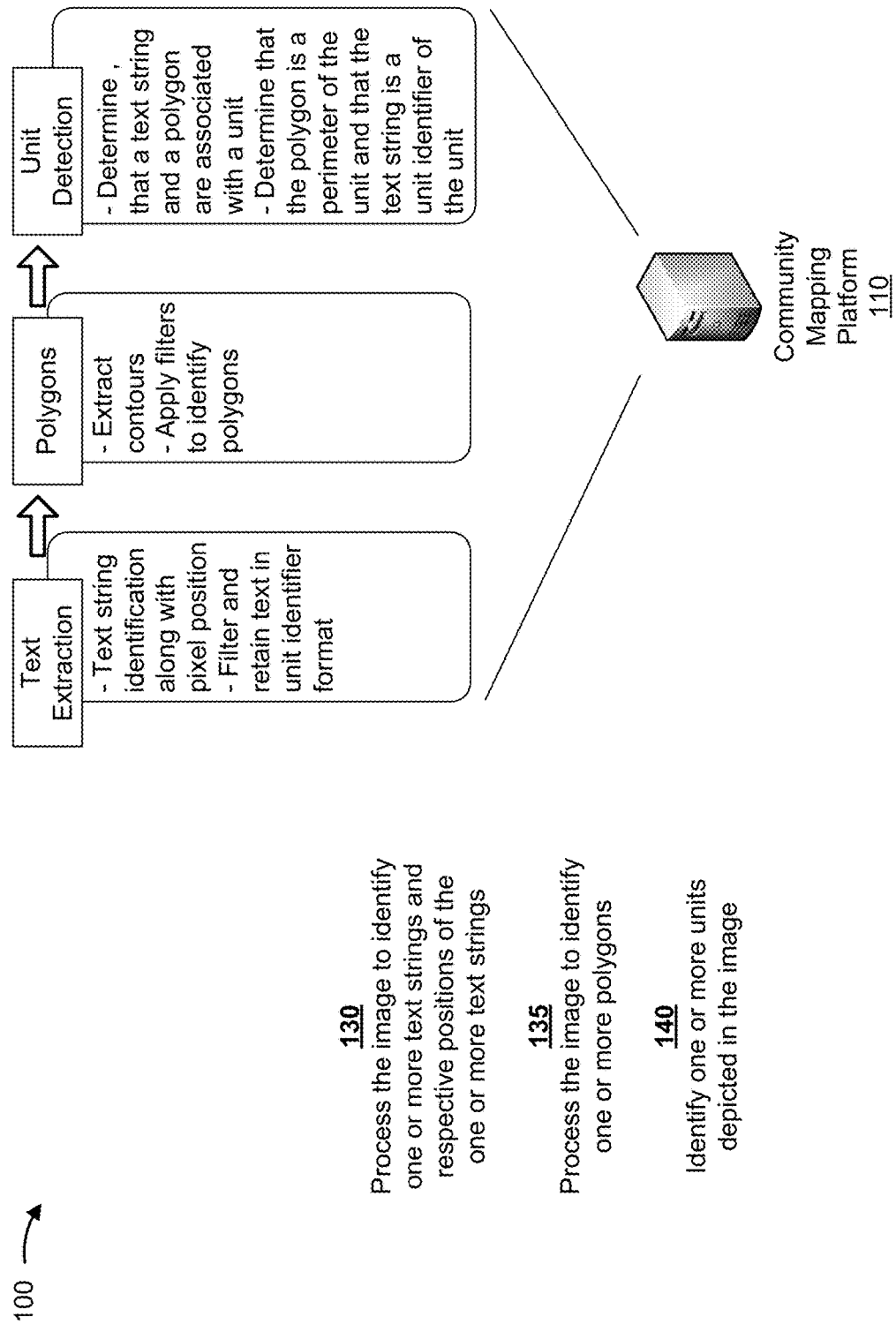

As shown in FIG. 1B, and by reference number 130, community mapping platform 110 may process the image to identify one or more text strings and/or respective positions (e.g., pixel positions) of the one or more text strings depicted in the image. For example, community mapping platform 110 may detect a plurality of text strings depicted in the image and may identify the one or more text strings by applying one or more filters to the plurality of text strings (e.g., to remove text strings that do not conform to a particular format, such as a unit identifier format; to remove nonsensical or erroneous text strings; to remove falsely identified text strings; and/or the like). In some implementations, community mapping platform 110 may use a first computer vision model, such as an optical character recognition model, to detect the one or more text strings and/or the respective positions of the one or more text strings depicted in the image.

The first computer vision model may be a machine learning model that is trained to identify text strings associated with a community. For example, the first computer vision model may be trained to detect text strings that represent a street identifier, a community identifier, a location identifier, a building identifier, a unit identifier, and/or the like. In this way, community mapping platform 110 may identify community location information associated with the community, such as a street address of the community, a street address of a unit of the community, information identifying a street associated with the community, information identifying an intersection of streets within the community, and/or the like. In some implementations, community mapping platform 110 (or another device) may train the machine learning model using previously identified community images, previously identified community identifier text strings, previously identified unit identifier text strings, previously identified street identifier text strings, and/or the like. Using this historical data as inputs to the machine learning model, community mapping platform 110 may identify one or more relationships to identify text strings associated with a community. The first computer vision model may be trained and/or used in a similar manner to that described below with respect to FIGS. 2 and 3.

As further shown in FIG. 1B, and by reference number 135, community mapping platform 110 may process the image to identify one or more polygons and/or respective positions (e.g., pixel positions) of the one or more polygons depicted in the image. For example, community mapping platform 110 may use one or more image processing techniques (e.g., converting the image to grey scale, using an automatic canny technique, a Gaussian image blurring technique, an edge detection technique, a convex hull technique, and/or the like) to identify and/or extract a plurality of contours in the image and may identify, by applying one or more filters to the plurality of contours, the one or more polygons, and/or the respective positions of the one or more polygons. For example, community mapping platform 110 may apply one or more filters to the plurality of contours to remove one or more sets of contours from the plurality of contours that are not consistent with enclosed polygons. In some implementations, community mapping platform 110 may use a second computer vision model, such as an object detection model, to detect the one or more polygons and/or the respective positions of the one or more polygons depicted in the image.

The second computer vision model may be a machine learning model that is trained to identify polygons associated with units of a community. For example, the second computer vision model may be trained to identify a unit of the community (e.g., an apartment, a condominium, a suite, and/or the like of the community) by detecting a polygon that encloses (e.g., surrounds) a text string, detecting a polygon that is within a threshold distance of a text string, and/or the like. In some implementations, community mapping platform 110 (or another device) may train the machine learning model using previously identified community images, previously identified polygons depicted in the previously identified community images, previous determinations of whether a polygon depicted in a community image is associated with a unit of a community, and/or the like. Using this historical data as inputs to the machine learning model, community mapping platform 110 may identify one or more relationships to identify text strings associated with a community.

As further shown in FIG. 1B, and by reference number 140, community mapping platform 110 may identify and/or determine one or more units depicted in the image (e.g., based on the one or more text strings, the respective positions of the one or more text strings, the one or more polygons, the respective positions of the one or more polygons, and/or the like). In some implementations, community mapping platform 110 may determine, based on a position of a text string and a position of a polygon, that the text string and the polygon are associated with a unit depicted in the image (e.g., a unit of the community). For example, community mapping platform 110 may determine, based on the position of the text string and the position of the polygon, that the text string is enclosed (or partially enclosed) within the polygon. Community mapping platform 110 may, therefore, determine that the polygon is a perimeter of a unit (e.g., a footprint of the unit) and that the text string corresponds to a unit identifier of the unit.

Additionally, or alternatively, the position of the text string may correspond to a text pixel location of a portion of the text string (e.g., a representative pixel location of the text string, such as a midpoint of the text string) and the position of the polygon may correspond to a polygon pixel location of the polygon (e.g., a representative pixel location of the polygon, such as a midpoint of the polygon). Community mapping platform 110 may determine that the text string and the polygon are associated with the unit when a distance between the text pixel location and the polygon pixel location satisfies (e.g., is less than) a threshold distance. The threshold distance may be measured in pixels and/or may be based on a size of the image (e.g., the threshold distance may be a percentage of a width, a height, an area, and/or the like, of the image).

Figure 1C:
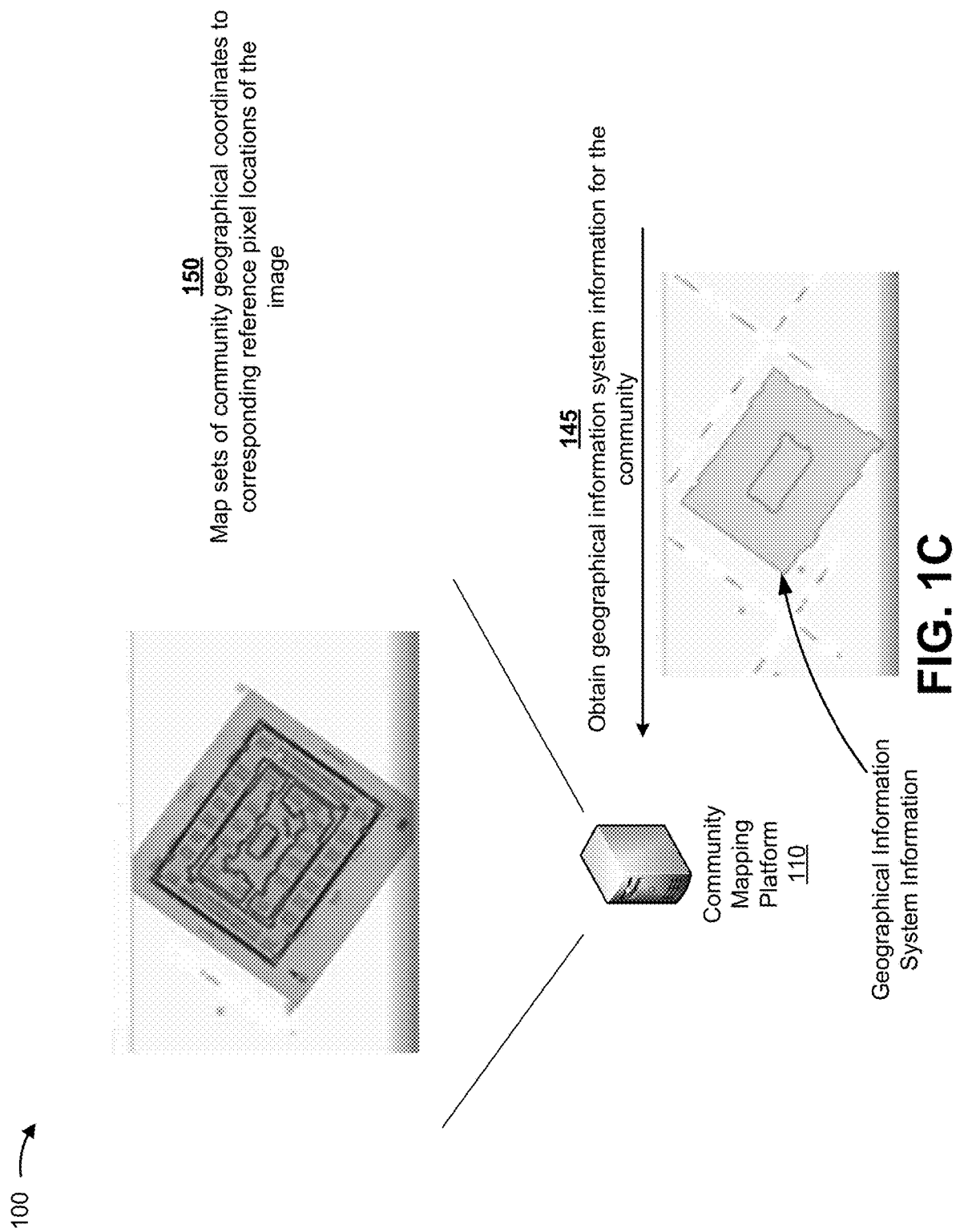

As shown in FIG. 1C, and by reference number 145, community mapping platform 110 may obtain geographical information system (GIS) information associated with the community (e.g., from a geographical information system that provides virtual maps). For example, community mapping platform 110 may establish a communication session associated with a geographical information system and send a request (e.g., a message indicating a street address of the community) for GIS information associated with the community. The geographical information system may send, in response, the GIS information to community mapping platform 110. The GIS information may include a plurality of sets of community geographical coordinates (e.g., sets of latitude and longitude coordinates) associated with the community. For example, the GIS information may include a plurality of sets of community geographical coordinates that define a property boundary of the community.

In some implementations, community mapping platform 110 may determine, based on the GIS information, particular sets of community geographical coordinates for a set of reference locations of the community. The reference locations of the community may include property boundary locations associated with the community (e.g., corner property boundary locations), landmarks associated with the community (e.g., buildings; natural features, such as trees, ponds, lakes, hills, valleys, and/or the like; roads; driveways; intersections; and/or the like), and/or the like. For example, community mapping platform 110 may identify, based on the community location information, a first reference location (e.g., a first corner property boundary location) and a second reference location (e.g., a second corner property boundary location) and may convert, based on the GIS information, the first reference location and the second reference location to respective sets of community geographical coordinates.

As shown in FIG. 1C, and by reference number 150, community mapping platform 110 may map the sets of community geographical coordinates to corresponding reference pixel locations of the image. For example, community mapping platform 110 may determine, based on the GIS information, reference pixel locations of the image that correspond to the sets of reference locations of the community. Community mapping platform 110 may, therefore, map the reference pixel locations to the sets of community geographical coordinates. For example, community mapping platform 110 may map reference pixel locations of a property boundary of the community in the image to sets of community geographical coordinates in the GIS information. In some implementations, mapping the reference pixel locations to the sets of community geographical coordinates includes determining a scaling factor (e.g., by taking a ratio of the corresponding reference pixel locations in the image plane and the GIS plane) and mapping the reference pixel location on the GIS plane. The Community mapping platform 110 may store the mapping in a data structure (e.g., a database, a table, a list, and/or the like) associated with community mapping platform 110.

Figure 1D:
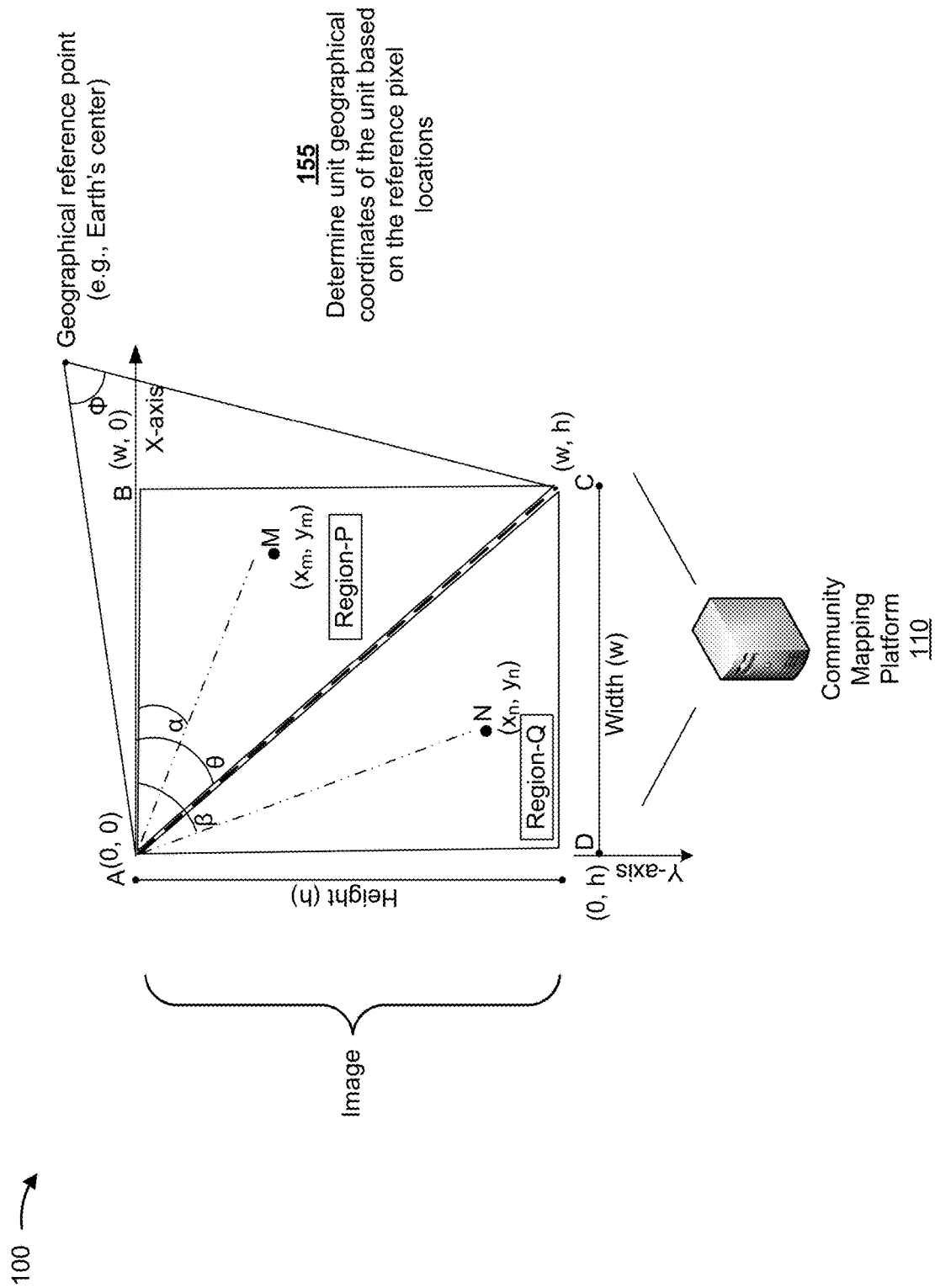

As shown in FIG. 1D, and by reference number 155, community mapping platform 110 may determine unit geographical coordinates of the unit that is to be qualified to receive the service (e.g., as described herein in relation to FIG. 1A). In some implementations, community mapping platform 110 may determine and/or identify respective vectors associated with the sets of community geographical coordinates that correspond to the reference pixel locations of the image. For example, community mapping platform 110 may determine a vector based on a distance and an angle between a set of community geographical coordinates and a geographical reference point (e.g., the earth's center as shown in FIG. 1D) and a distance and an angle between a reference pixel location and the polygon pixel location of the polygon associated with the unit. Community mapping platform 110 may, therefore, determine the unit geographical coordinates based on the respective vectors associated with the sets of community geographical coordinates.

For example, with reference to the diagram in FIG. 1D, an image may include reference pixel locations A, B, C, and D (e.g., associated with corner property boundary locations of the community) that have corresponding community geographical coordinates. The image may be divided into two regions (e.g., Region-P and Region-Q) by a diagonal line (e.g., a vector), AC, connecting reference pixel location A to reference pixel location C. A first unit may be associated with a pixel location M (e.g., that is associated with a first polygon) that lies within Region-P and a second unit may be associated with a pixel location N (e.g., that is associated with a second polygon) that lies within Region-Q. The angle Φ may be a bearing associated with a geographical reference point (e.g., the Earth's center), which may be calculated based on the community geographical coordinates associated with reference pixel locations A and C. The angle α may be the angle between the line AM and the x-axis; the angle β may be the angle between the line AN and the x-axis; and the angle θ is the angle between the line AC and the x-axis.

Region-P and Region-Q may be represented by the following formula:

$$f(\Phi) = \begin{cases} \Phi_{base} + \theta_{AC} - \theta_{base}, \theta < \theta_{base} \\ \Phi_{base} - \theta_{AC} - \theta_{base}, \theta \geq \theta_{base} \end{cases}.$$

For pixel location M that lies within Region-P and has pixel coordinates $(x_m, y_m)$ in the image, the angle $\Phi_{AM}$ may equal the angle Φ plus the angle α minus the angle θ.

Accordingly, polar coordinates of the pixel location M may be represented by the following formula:

$$(r_m, \alpha_m) = (\sqrt{(x_m^2 + y_m^2)}, \Phi_{AM})$$

where $r_m$ is a distance that the pixel location M is from an origin pixel location (e.g., (0, 0)) and $\alpha_m$ is the angle between the line AM and the x-axis.

Community mapping platform 110 may, therefore, determine the unit geographical coordinates ($lat_M$, $lon_M$) of the pixel location M, based on the community geographical coordinates ($lat_A$, $lon_A$) of the reference pixel location A, according to the following formulas:

$$lat_M = \{\sin(lat_A) \times \cos(r/R) + \cos(lat_A) \times \sin(r/R) \times \cos(\Phi_{AM})\},$$

and $$lon_M = lon_A + \left\{\frac{\tan^{-1}(\sin(\Phi) \times \sin(r/R) \times \cos(\Phi_{AM}))}{\cos(r/R) - \sin(lat_A) \times \sin(lat_M)}\right\},$$

where R is the radius of the Earth.

For pixel location N that lies within Region-Q and has pixel coordinates ($x_n$, $y_n$) in the image, an angle $\Phi_{AN}$ may equal the angle $\Phi_{AC}$ plus the angle β minus the angle θ. Accordingly, polar coordinates of the pixel location M may be represented by the following formula:

$$(r_n, \beta_n) = (\sqrt{(x_n^2 + y_n^2)}, \Phi_{AN},$$

where $r_n$ is a distance the pixel location N is from the origin pixel location (e.g., (0, 0)) and $\beta_n$ is the angle between the line AN and the x-axis.

Community mapping platform 110 may, therefore, determine the unit geographical coordinates ($lat_N$, $lon_N$) of the pixel location N, based on the community geographical coordinates ($lat_A$, $lon_A$) of the reference pixel location A, according to the following formulas:

$$f(lat_N) = \sin^{-1}\{\sin(lat_A) \times \cos(r/R) + \cos(lat_A) \times \sin(r/R) \times \cos(\Phi_{AN})\},$$

and $$f(lon_N) = lon_A + \left\{\frac{\tan^{-1}(\sin(\Phi) \times \sin(r/R) \times \cos(\Phi_{AN}))}{\cos(r/R) - \sin(lat_A) \times \sin(lat_N)}\right\},$$

where R is the radius of the Earth.

In some implementations, community mapping platform 110 may determine the unit geographical coordinates of the unit based on the reference pixel locations and/or one or more pixel locations associated with the polygon associated with the unit (e.g., one or more pixel locations that define a perimeter of the polygon and thus a perimeter of the unit). The unit geographical coordinates may, therefore, comprise sets of unit geographical coordinates associated with the perimeter of the unit.

Figure 1E:
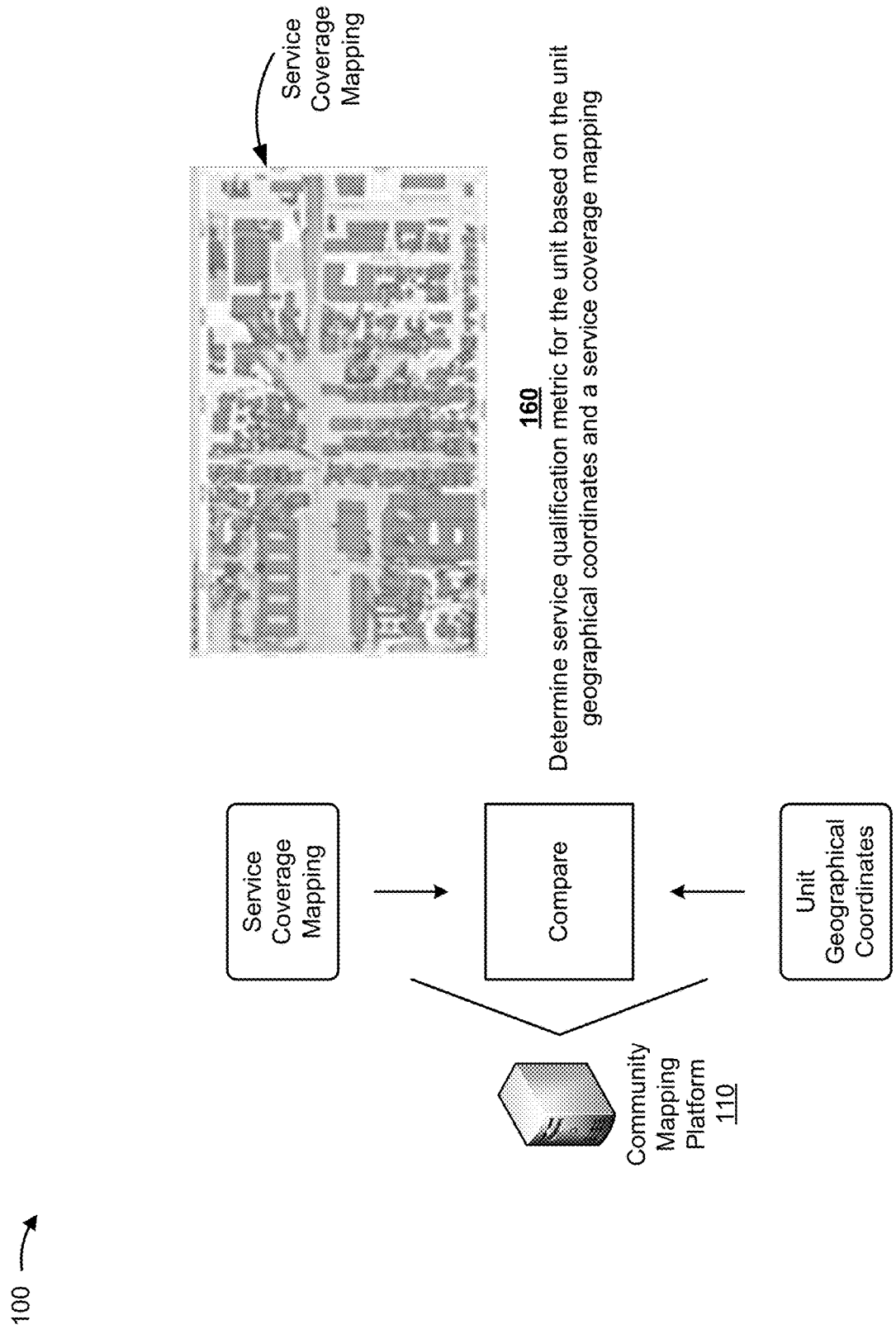

As shown in FIG. 1E, and by reference number 160, community mapping platform 110 may determine a service qualification metric for the unit based on the unit geographical coordinates of the unit and a service coverage mapping that is associated with the community. The service qualification metric may indicate a capability of receiving the service within the unit. For example, the service qualification metric may indicate whether the unit is associated with one or more unit geographical coordinates where network coverage of a network (e.g., associated with the service) exists and/or where the network coverage is sufficiently strong to allow the service to be provided to the unit.

In some implementations, community mapping platform 110 may obtain the service coverage mapping from a data structure (e.g., a database, a table, a list, and/or the like) associated with community mapping platform 110 (e.g., based on the sets of community geographical coordinates, the unit geographical coordinates, and/or the like). For example, community mapping platform 110 may perform a lookup operation (e.g., based on a street address associated with the community) to identify a service coverage mapping associated with the community. The service coverage data mapping may indicate an existence and/or strength of network coverage of the network (e.g., associated with the service) at one or more community geographical coordinates.

In some implementations, community mapping platform 110 may compare at least one unit's geographical coordinate and the service coverage mapping to determine the service qualification metric for the unit. For example, community mapping platform 110 may perform a lookup operation, based on a unit geographical coordinate, of the service coverage mapping to determine an existence and/or strength of network coverage of the network at the unit geographical coordinate. The service qualification metric may indicate that the unit is capable of receiving the service when the network coverage exists and/or is sufficiently strong (e.g., a strength of signal that satisfies a threshold) to allow the service to be provided to the unit. The service qualification metric may indicate that the unit is not capable of receiving the service when the network coverage does not exist and/or is not sufficiently strong (e.g., a strength of signal that does not satisfy a threshold) to allow the service to be provided to the unit. In some aspects, the service qualification metric may represent a range of qualification from unqualified to partially qualified to fully qualified (i.e., no coverage, to partial coverage, to complete coverage).

Figure 1F:
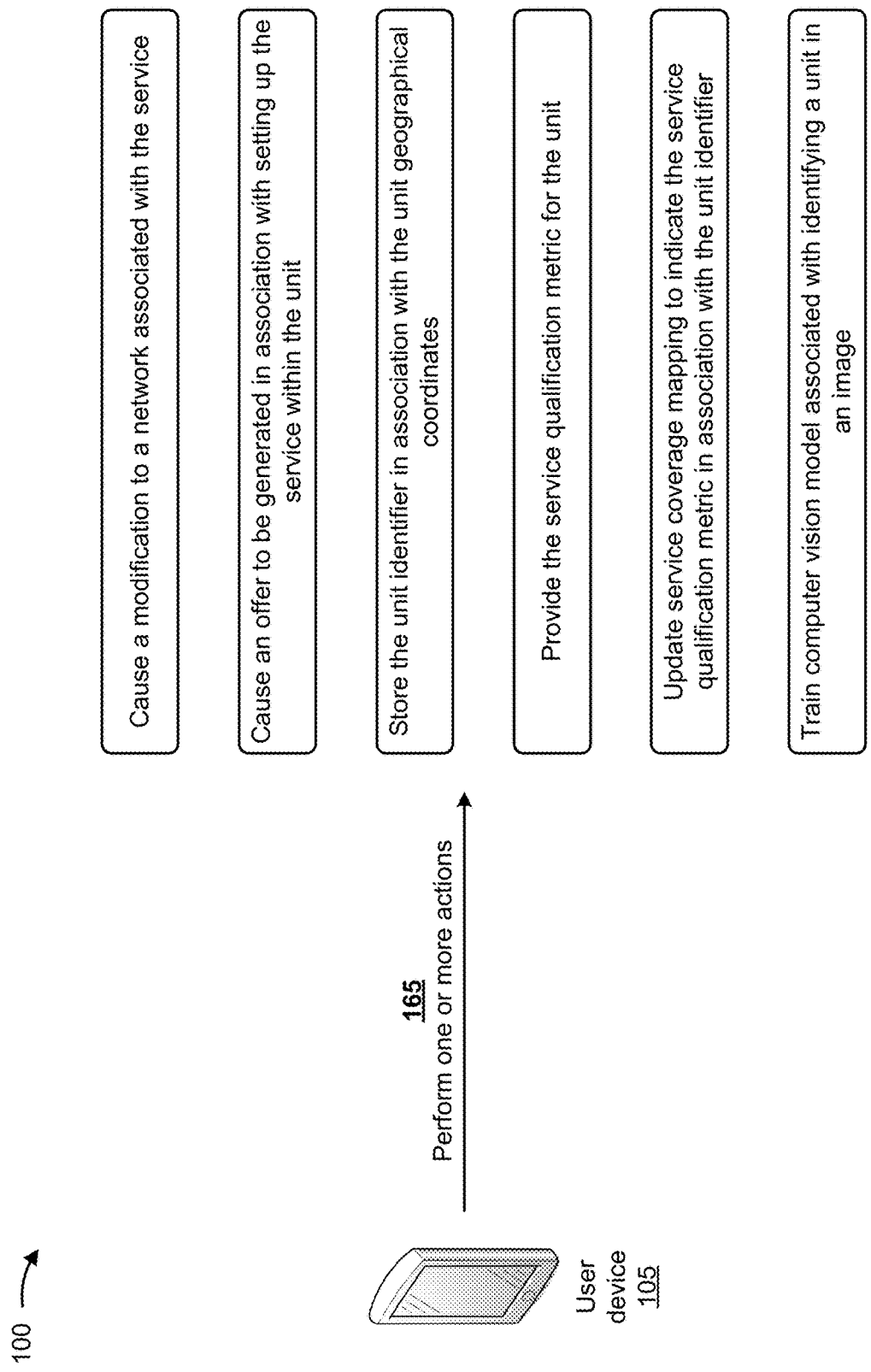

As shown in FIG. 1F, and by reference number 165, community mapping platform 110 may perform one or more actions (e.g., based on the service qualification metric, the unit identifier, the unit geographical coordinates, and/or the like). In some implementations, the one or more actions may include causing a modification to a network associated with the service. For example, when the service qualification metric indicates that the unit is not capable of receiving the service, community mapping platform 110 may cause a modification to the network configured to provide the service (e.g., to cause network coverage to reach a unit geographical coordinate). Community mapping platform 110 may send a network modification request to a network provider of the network to cause the modification to the network. In this way, community mapping platform 110 may improve network coverage to the unit of the community, thereby conserving resources that would otherwise be wasted addressing the network issue.

In some implementations, the one or more actions may include causing, based on the service qualification metric and the unit identifier, an offer to be generated in association with receiving the service within the unit. The offer may include the unit identifier as part of a recipient address of the offer. Community mapping platform 110 and/or another device may cause the offer to be sent to the recipient address. In some implementations, the one or more or more actions may include providing, to a service management device, an indication of the service qualification metric and the text string that is associated with the unit (e.g., to permit the service management device to generate and send a service offer to the unit). In this way, community mapping platform 110 may facilitate providing the service to the unit, thereby conserving resources that would otherwise be wasted attempting to provide the service to the unit.

In some implementations, the one or more actions may include storing (or causing to be stored) the unit identifier in association with the unit geographical coordinates (e.g., in the GIS information by the geographical information system). In some implementations, the one or more or more actions may include providing (e.g., to user device 105, a service management device, and/or the like) a notification that includes the service qualification metric, the unit identifier, the unit geographical coordinates, and/or the like.

In some implementations, the one or more or more actions may include updating the service coverage mapping to indicate the service qualification metric in association with the unit geographical coordinates, the unit identifier, the text string associated with the unit identifier, and/or the like.

In some implementations, the one or more actions may include providing, to user device 105, a request to verify unit information of the unit. The request may identify the unit identifier and/or the perimeter of the unit. Community mapping platform 110 may receive, from user device 105, a response that includes verification information associated with the unit information. Community mapping platform 110 may train the first computer vision model or the second computer vision model (e.g., in a similar manner as that described herein in relation to FIG. 2) based on the verification information.

As indicated above, FIGS. 1A-1F are provided merely as one or more examples. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
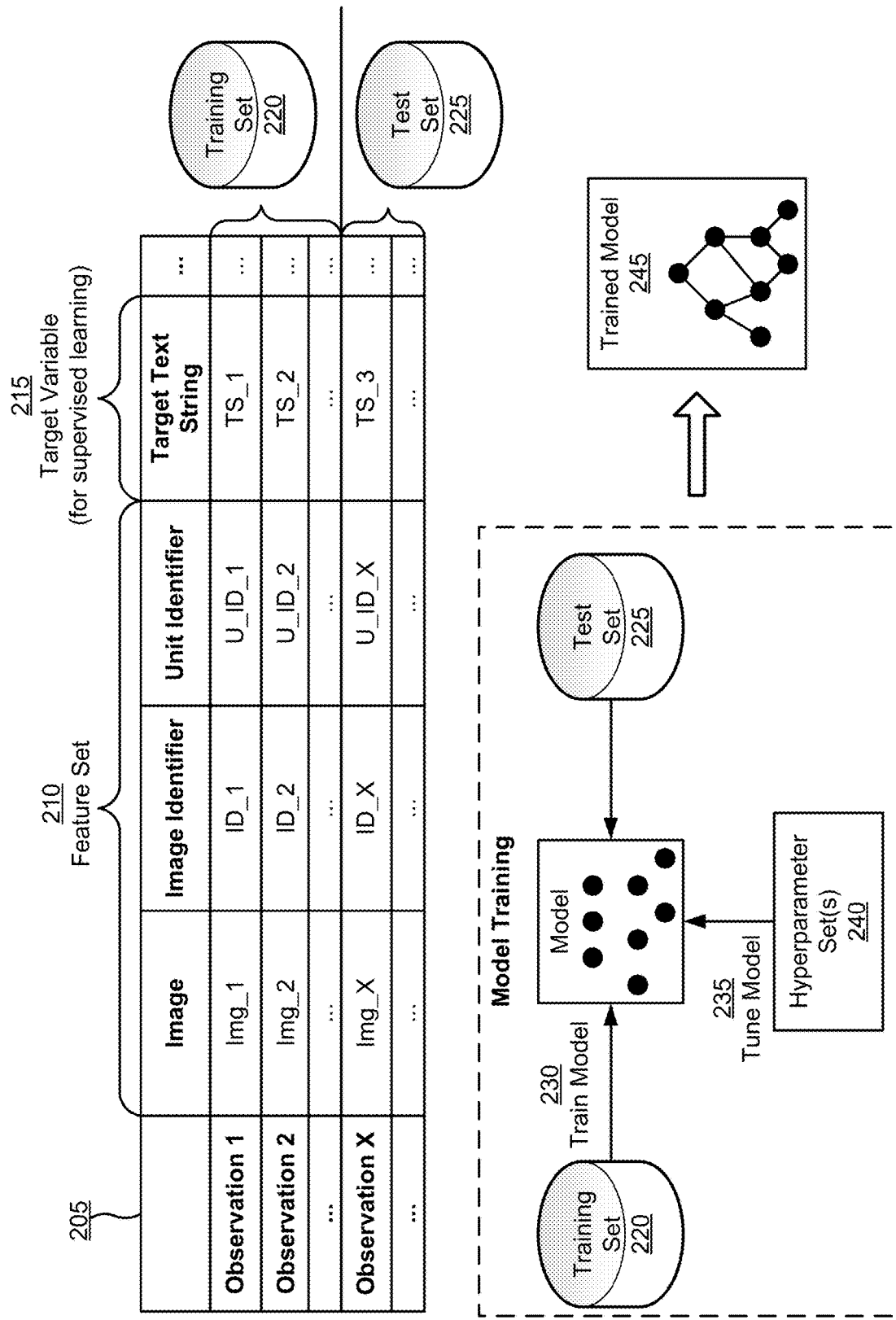
FIGS. 2 and 3 are diagrams of one or more example implementations described herein.

FIG. 2 is a diagram illustrating an example 200 of training a machine learning model in connection with identifying a service qualification of a unit of a community. The machine learning model training described herein may be performed using a machine learning system. The machine learning system may include or may be included in a computing device, a server, a cloud computing environment, and/or the like, such as a user device 105 and/or a community mapping platform 110, described in more detail below.

As shown by reference number 205, a machine learning model may be trained using a set of observations. The set of observations may be obtained and/or input from historical data, such as data gathered during one or more processes described herein. For example, the set of observations may include data gathered from obtaining a image and processing the image to identify text strings associated with a community, as described elsewhere herein. In some implementations, the machine learning system may receive the set of observations (e.g., as input) from user device 105, community mapping platform 110, and/or the like.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from user device 105, community mapping platform 110, and/or the like. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from user device 105, community mapping platform 110, and/or the like, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of an image, a second feature of an image identifier text string, a third feature of a unit identifier text string, and so on. As shown, for a first observation, the first feature may have a value of Img_1, the second feature may have a value of ID_1, the third feature may have a value of U_ID_1, and so on. These features and feature values are provided as examples, and may differ in other examples. For example, the feature set may include one or more of the following features: a street identifier text string, a location identifier text string, a building identifier text string, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is a text string, which has a value of TS_1 for the first observation.

The feature set and target variable described above are provided as examples, and other examples may differ from what is described above. For example, for a target variable of a polygon associated with a unit of a community, the feature set may include a community image, a polygon depicted in the community image, a determination of whether the polygon is associated with a unit of the community, and/or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. For example, the machine learning system may utilize image recognition, optical character recognition, object detection, image segmentation, and/or the like to determine the set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
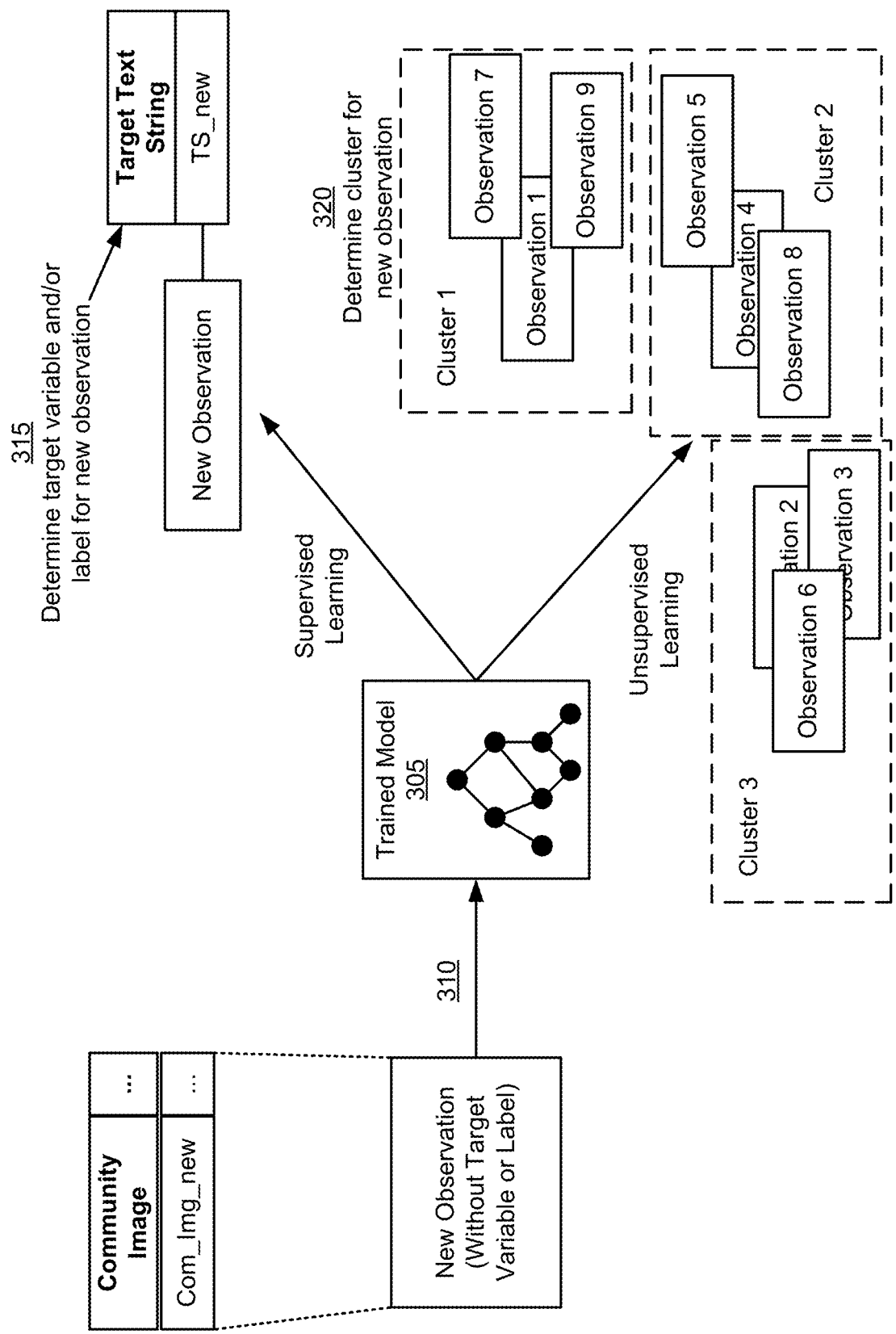

FIG. 3 is a diagram illustrating an example 300 of applying a trained machine learning model to a new observation associated with identifying a service qualification of a unit of a community. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as user device 105, community mapping platform 110, and/or the like.

As shown by reference number 310, the machine learning system may receive a new observation (or a set of new observations), and may input the new observation to the machine learning model 305. As shown, the new observation may include a feature of a new community image (e.g., that includes one or more text strings), as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of TS new for the target variable of a text string associated with a community for the new observation, as shown by reference number 315. Based on this prediction (e.g., based on the value having a particular label or classification, based on the value satisfying or failing to satisfy a threshold, and/or the like), the machine learning system may provide a recommendation and/or output for determination of a recommendation, such as a recommendation that the text string is associated with a unit of the community. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., unit identifier text strings), then the machine learning system may perform a first automated action and/or may cause a first automated action to be performed (e.g., by instructing another device to perform the automated action) based on classifying the new observation in the first cluster, such as determining and/or identifying a unit of the community.

In this way, the machine learning system may apply a rigorous and automated process to identifying a test string associated with a community. The machine learning system enables recognition and/or identification of tens, hundreds, thousands, or millions of features and/or feature values for tens, hundreds, thousands, or millions of observations, thereby increasing accuracy and consistency and reducing delay associated with identifying the test string associated with the community relative to requiring computing resources to be allocated for tens, hundreds, or thousands of operators to manually identify a test string associated with the community using the features or feature values. In some implementations, the same or similar machine learning system may be used to identify a polygon associated with a unit of the community and/or the like.

As indicated above, FIG. 3 is provided as an example. Other examples may differ from what is described in connection with FIG. 3.

Figure 4:
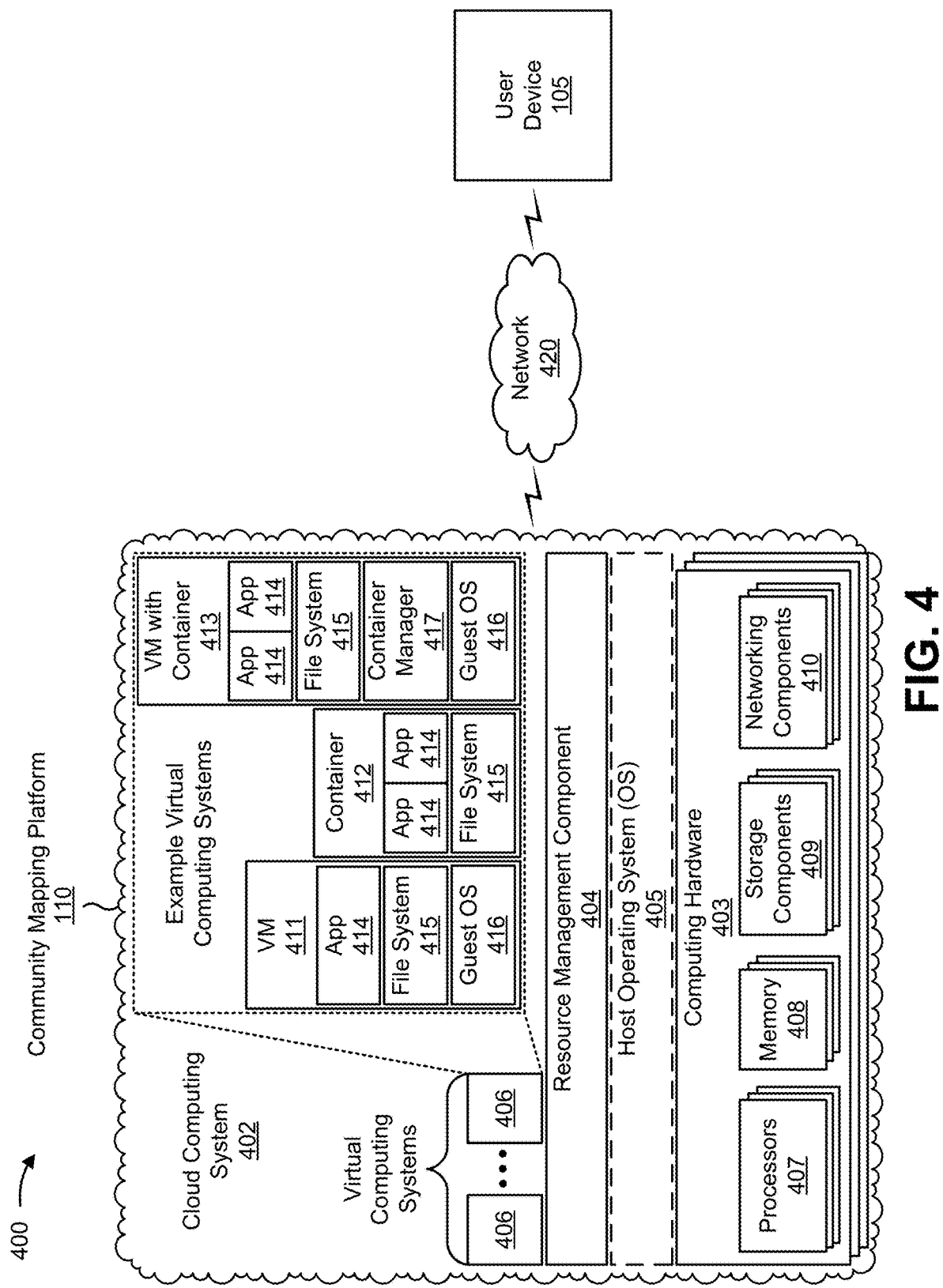
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include community mapping platform 110. The community mapping platform 110 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, and/or user device 105. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the community mapping platform 110 to perform one or more operations or processes described herein. A storage component 409 includes a hard disk or another type of storage device that stores information, data, and/or software (e.g., code, instructions, and/or the like) related to the operation and use of the community mapping platform 110. In some implementations, memory 408 and/or storage component 409 is/are implemented as a non-transitory computer readable medium. A networking component 410 includes a network interface and corresponding hardware that enables the community mapping platform 110 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application (s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the community mapping platform 110 may include one or more elements 403-417 of the cloud computing system 402, may execute within the cloud computing system 402, and/or may be hosted within the cloud computing system 402, in some implementations, the community mapping platform 110 may not be cloud-based (e.g., may be implemented outside of a cloud computing system) or may be partially cloud-based. For example, the community mapping platform 110 may include one or more devices that are not part of the cloud computing system 402, such as device 500 of FIG. 5, which may include a stand-alone server or another type of computing device. The community mapping platform 110 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. User device 105 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
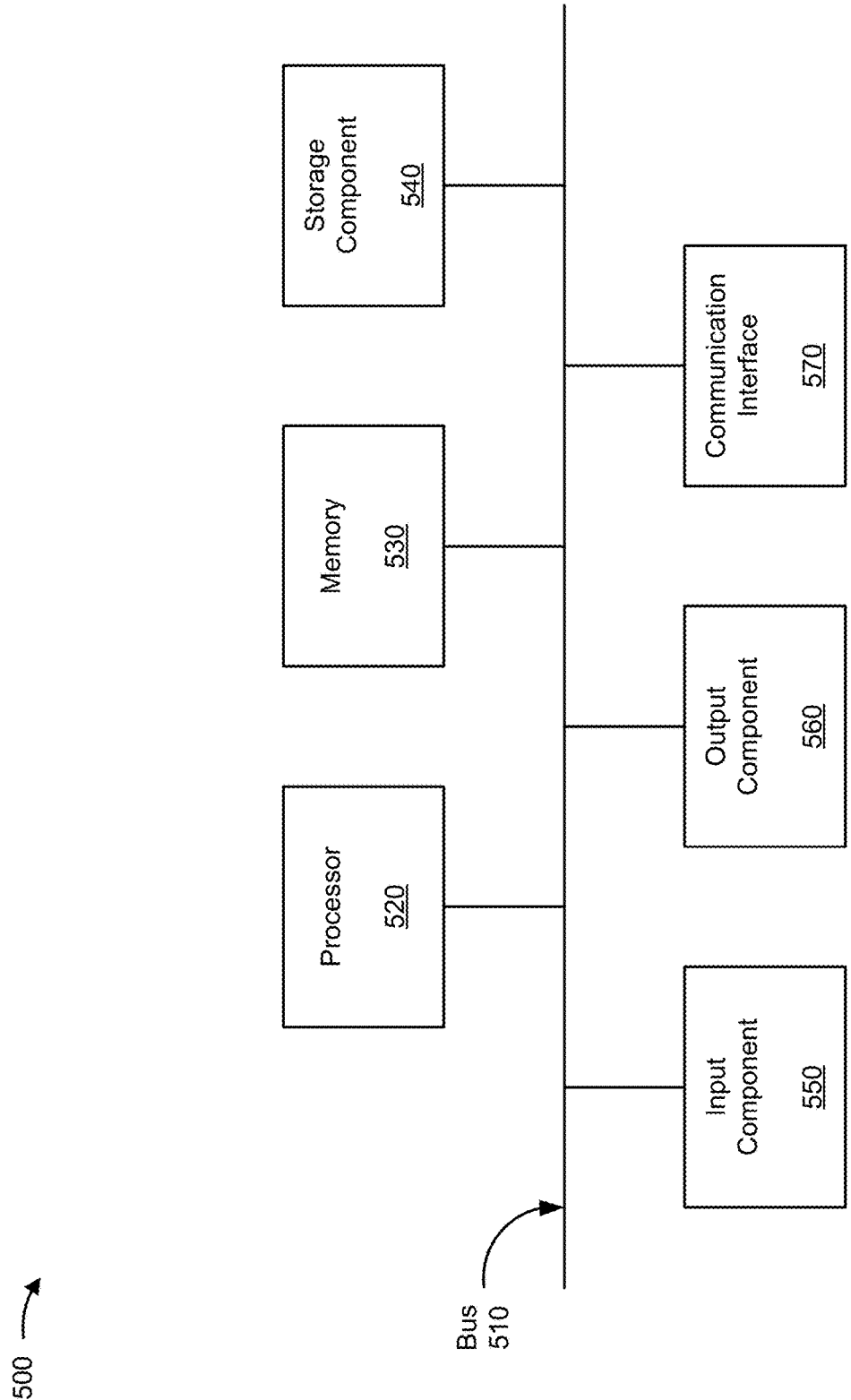
FIG. 5 is a diagram of example components of one or more devices of FIG. 4.

FIG. 5 is a diagram of example components of a device 500. Device 500 may correspond to user device 105, community mapping platform 110, and/or computing hardware 403. In some implementations, user device 105, community mapping platform 110, and/or computing hardware 403 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
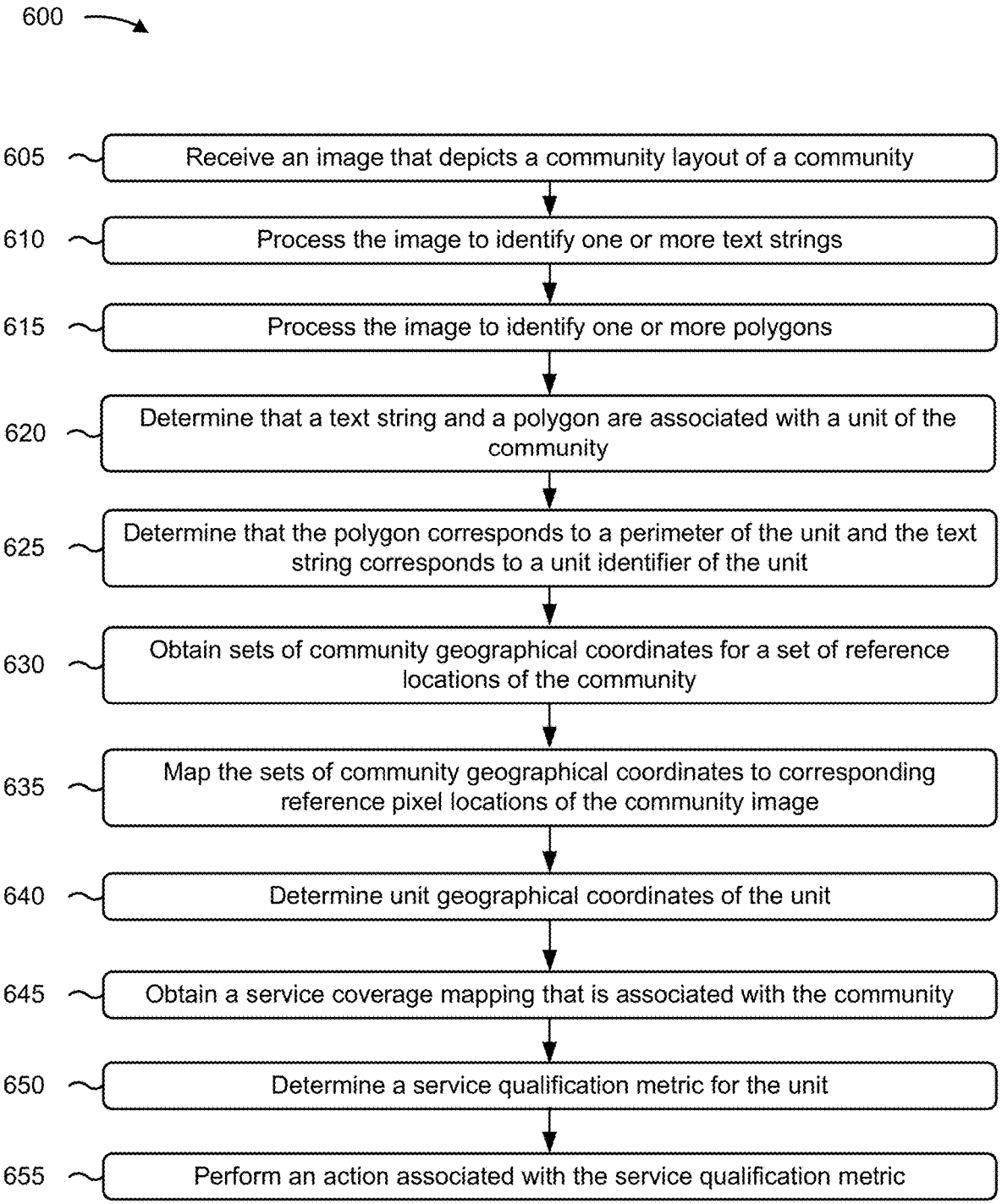
FIG. 6 is a flow chart of an example process relating to identifying a service qualification of a unit of a community.

FIG. 6 is a flow chart of an example process 600 associated with identifying a service qualification of a unit of a community. In some implementations, one or more process blocks of FIG. 6 may be performed by a device (e.g., community mapping platform 110). In some implementations, one or more process blocks of FIG. 6 may be performed by another device or a group of devices separate from or including the device, such as user device 105. Additionally, or alternatively, one or more process blocks of FIG. 6 may be performed by one or more components of computing hardware 403, such as processors 407, memory 408, storage component 409, networking components 410, and/or the like, and/or by one or more components of a device 500, such as processor 520, memory 530, storage component 540, input component 550, output component 560, communication interface 570, and/or the like.

As shown in FIG. 6, process 600 may include receiving an image that depicts a layout of a community (block 605). For example, the device may receive an image that depicts a layout of a community, as described above.

As further shown in FIG. 6, process 600 may include processing the image to identify one or more text strings (block 610). For example, the device may process (e.g., using a first computer vision model) the image to identify one or more text strings in the image, as described above. In some implementations, the first computer vision model comprises an optical character recognition model that is trained to identify community location information by detecting text strings that represent at least one of a street identifier, a community identifier, a location identifier, a building identifier, or a unit identifier.

Additionally, or alternatively, the device may identify communication location information associated with the community. The communication location information comprises at least one of: a street address of the community, a street address of a unit of the community, information identifying a street associated with the community, or information identifying an intersection of streets within the community.

As further shown in FIG. 6, process 600 may include processing the image to identify one or more polygons (block 615). For example, the device may process (e.g., using a second computer vision model) the image to identify one or more polygons that are depicted in the image, as described above. In some implementations, the second computer vision model comprises an object detection model that is trained to identify units of the community by detecting at least one of: polygons that enclose text strings, or polygons that are within a threshold distance of text strings. In some implementations, the polygon is identified based on being depicted within a threshold distance of the text string.

As further shown in FIG. 6, process 600 may include determining that a text string and a polygon are associated with a unit of the community (block 620). For example, the device may determine that a text string and a polygon are associated with a unit of the community (e.g., based on a position of the text string and a position of the polygon), as described above.

In some implementations, the position of the text string corresponds to a text pixel location of a portion of the text string and the position of the polygon corresponds to a polygon pixel location of the polygon, and determining that the text string and the polygon are associated with the unit includes determining a distance between the text pixel location and the polygon pixel location is less than a threshold distance.

In some implementations, determining that the text string and the polygon are associated with the unit includes determining, based on the position of the text string and the position of the polygon, that the text string is enclosed within the polygon, wherein the polygon is determined to be the perimeter and the text string is determined to be the unit identifier based on the text string being enclosed within the polygon.

As further shown in FIG. 6, process 600 may include determining that the polygon corresponds to a perimeter of the unit and the text string corresponds to a unit identifier of the unit (block 625). For example, the device may determine (e.g., based on determining that the text string and the polygon are associated with the unit) that the polygon corresponds to a perimeter of the unit and the text string corresponds to a unit identifier of the unit, as described above.

As further shown in FIG. 6, process 600 may include obtaining sets of community geographical coordinates for a set of reference locations of the community (block 630). For example, the device may obtain sets of community geographical coordinates for a set of reference locations of the community, as described above.

In some implementations, obtaining sets of community geographical coordinates for a set of reference locations of the community includes using a geographical information system to determine the sets of community geographical coordinates, which comprises identifying, based on the community location information, a first reference location and a second reference location, the first reference location and the second reference location are reference locations of the set of reference locations, and converting, using the geographical information system, the first reference location and the second reference location to the sets of community geographical coordinates.

In some implementations, the image is received in association with reference location information that identifies the sets of community geographical coordinates or the set of reference locations, and obtaining the sets of community geographical coordinates for the set of reference locations of the community includes determining the sets of community geographical coordinates, which comprises determining the sets of community geographical coordinates based on the reference location information.

In some implementations, obtaining the sets of community geographical coordinates for the set of reference locations of the community includes determining the sets of community geographical coordinates, which comprises processing, using a computer vision model, the image to identify the set of reference locations, wherein the set of reference locations includes at least two of a street address of the community, a street address of a unit of the community, a street is associating with the community, and an intersection of streets within the community; and determining, using the geographical information system, the sets of community geographical coordinates based on identifying the set of reference locations.

As further shown in FIG. 6, process 600 may include mapping the sets of community geographical coordinates to corresponding reference pixel locations of the image (block 635). For example, the device may map the sets of community geographical coordinates to corresponding reference pixel locations of the image, as described above.

As further shown in FIG. 6, process 600 may include determining unit geographical coordinates of the unit (block 640). For example, the device may determine (e.g., using a geographical information system) unit geographical coordinates of the unit (e.g., based on the reference pixel locations, the sets of community geographical coordinates, a pixel location associated with the polygon, and/or the like), as described above.

In some implementations, determining the unit geographical coordinates comprises determining, using the geographical information system, reference pixel locations of the image that correspond to the sets of reference locations of the community; mapping the reference pixel locations to the sets of community geographical coordinates, and determining the unit geographical coordinates based on vectors between the unit geographical coordinates and the sets of community geographical coordinates.

In some implementations, the pixel location associated with the polygon is one of a plurality of pixel locations of the polygon, and determining the unit geographical coordinates includes determining the unit geographical coordinates based on the plurality of pixel locations, wherein the unit geographical coordinates comprise sets of geographical coordinates of the perimeter of the unit, and wherein the service qualification metric is determined based on whether the service is available at one of the sets of geographical coordinates of the perimeter.

In some implementations, determining the unit geographical coordinates comprises determining vectors associated with the unit geographical coordinates and the sets of community geographical coordinates, wherein the unit geographical coordinates are determined based on the vectors. The vectors may be determined based on distances and angles between the sets of community geographical coordinates and a geographical reference point, and distances and angles between the reference pixel locations and the pixel location associated with the polygon.

As further shown in FIG. 6, process 600 may include obtaining a service coverage mapping that is associated with the community (block 645). For example, the device may obtain (e.g., based on the sets of community geographical coordinates, the communication location information, and/or the like) a service coverage mapping that is associated with the community, as described above.

As further shown in FIG. 6, process 600 may include determining a service qualification metric for the unit (block 650). For example, the device may determine (e.g., based on the service coverage mapping and the unit geographical coordinates) a service qualification metric for the unit, as described above. In some implementations, the service qualification metric is associated with a capability of receiving a service within the unit.

As further shown in FIG. 6, process 600 may include performing an action associated with the service qualification metric (block 655). For example, the device may perform an action associated with the service qualification metric, as described above.

In some implementations, performing the action comprises at least one of providing the service qualification metric to a user device that provided the image, providing, to a service management device, an indication of the service qualification metric and the text string that is associated with the unit, or updating the service coverage mapping to indicate the service coverage metric in association with the unit geographical coordinates and the text string.

In some implementations, performing the action comprises providing, to a service management device, a notification that includes the service qualification metric and the unit identifier, causing, based on the service qualification metric and the unit identifier, an offer to be generated in association with receiving the service within the unit, or updating the service coverage mapping to indicate the service qualification metric in association with the unit geographical coordinates and the unit identifier.

In some implementations, performing the action comprises storing the unit identifier in association with the unit geographical coordinates, providing a service qualification metric that is associated with receiving a service within the unit, or updating a service coverage mapping to indicate the service qualification metric in association with the unit geographical coordinates and the unit identifier.

In some implementations, process 600 further includes providing, to a user device that provided the image, a request to verify unit information of the unit, wherein the request is identifying at least one of the unit identifier or the perimeter; receiving, from the user device, a response that includes verification information associated with the unit information; and training, based on the verification information, a computer vision model based on the verification information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a community image that depicts a community layout of a community;
   identifying, by the device and using a first computer vision model, community location information associated with the community;
   using, by the device and based on the community location information, a geographical information system to determine sets of community geographical coordinates for a set of reference locations of the community;
   processing, by the device and using the first computer vision model, the community image to identify a text string in the community image;
   processing, by the device and using a second computer vision model, the community image to identify a polygon that is depicted in the community image;
   determining, by the device and based on a position of the text string and a position of the polygon, that the text string and the polygon are associated with a unit of the community;
   determining, by the device and using the geographical information system, unit geographical coordinates of the unit based on the sets of community geographical coordinates;
   obtaining, by the device and based the community location information, a service coverage mapping that is associated with the community;
   determining, by the device and based on the service coverage mapping and the unit geographical coordinates, a service qualification metric for the unit,
      wherein the service qualification metric is associated with a capability of receiving a service within the unit; and
   performing, by the device, an action associated with the service qualification metric,
      wherein performing the action, comprises at least one of:
         providing the service qualification metric to a user device that provided the community image,
         providing, to a service management device, an indication of the service qualification metric and the text string that is associated with the unit, or
         updating the service coverage mapping to indicate the service coverage metric in association with the unit geographical coordinates and the text string.

2. The method of claim 1, wherein the community location information comprises at least one of:
   a street address of the community,
   a street address of a unit of the community, or
   information identifying a street associated with the community, or
   information identifying an intersection of streets within the community.

3. The method of claim 1, wherein using the geographical information system to determine the sets of community geographical coordinates comprises:
   identifying, based on the community location information, a first reference location and a second reference location,
      wherein the first reference location and the second reference location are reference locations of the set of reference locations; and
   converting, using the geographical information system, the first reference location and the second reference location to the sets of community geographical coordinates.

4. The method of claim 1, wherein the first computer vision model comprises an optical character recognition model that is trained to identify the community location information by detecting text strings that represent at least one of:
   a street identifier,
   a community identifier,
   a building identifier,
   a location identifier, or
   a unit identifier.

5. The method of claim 1, wherein the second computer vision model comprises an object detection model that is trained to identify units of the community by detecting at least one of:
   polygons that enclose text strings, or polygons that are within a threshold distance of text strings,
      wherein the units of the community include the unit, the polygons include the polygon, and the text strings include the text string.

6. The method of claim 1, wherein determining the unit geographical coordinates comprises:
   determining, using the geographical information system, reference pixel locations of the community image that correspond to the sets of reference locations of the community;
   mapping the reference pixel locations to the sets of community geographical coordinates; and
   determining the unit geographical coordinates based on vectors between the unit geographical coordinates and the sets of community geographical coordinates.

7. The method of claim 1, wherein the community layout is an internal layout, and the community is a multi-unit building.

8. A device, comprising:
   one or more processors configured to:
      receive a community image that depicts a community layout of a community;
      process, using a first computer vision model, the community image to identify a text string in the community image;

process, using a second computer vision model, the community image to identify a polygon that is depicted in the community image;
determine, based on a position of the text string and a position of the polygon, that the text string and the polygon are associated with a unit of the community;
determine, based on determining that the text string and the polygon are associated with the unit, that the polygon corresponds to a perimeter of the unit and the text string corresponds to a unit identifier of the unit;
obtain sets of community geographical coordinates for a set of reference locations of the community;
map the sets of community geographical coordinates to corresponding reference pixel locations of the community image;
determine, using a geographical information system, unit geographical coordinates of the unit based on the reference pixel locations and a pixel location associated with the polygon;
obtain, based on the sets of community geographical coordinates, a service coverage mapping that is associated with the community;
determine, based on the service coverage mapping and the unit geographical coordinates, a service qualification metric for the unit,
wherein the service qualification metric is associated with a capability of receiving a service within the unit; and
perform an action associated with the service qualification metric and the unit identifier,
wherein the one or more processors, when performing the action, are configured to at least one of:
provide the service qualification metric to a user device that provided the community image,
provide, to a service management device, an indication of the service qualification metric and the unit identifier, or
update the service coverage mapping to indicate the service qualification metric in association with the unit geographical coordinates and the unit identifier.

9. The device of claim 8, wherein the position of the text string corresponds to a text pixel location of a portion of the text string and the position of the polygon corresponds to a polygon pixel location of the polygon,
wherein the one or more processors, when determining that the text string and the polygon are associated with the unit, are configured to:
determine a distance between the text pixel location and the polygon pixel location is less than a threshold distance.

10. The device of claim 8, wherein the one or more processors, when determining that the text string and the polygon are associated with the unit, are configured to:
determine, based on the position of the text string and the position of the polygon, that the text string is enclosed within the polygon,
wherein the polygon is determined to be the perimeter and the text string is determined to be the unit identifier based on the text string being enclosed within the polygon.

11. The device of claim 8, wherein the pixel location associated with the polygon is one of a plurality of pixel locations of the polygon,
wherein the one or more processors, when determining the unit geographical coordinates, are configured to:

determine the unit geographical coordinates based on the plurality of pixel locations,
wherein the unit geographical coordinates comprise sets of geographical coordinates of the perimeter of the unit,
wherein the service qualification metric is determined based on whether the service is available at one of the sets of geographical coordinates of the perimeter.

12. The device of claim 8, wherein the one or more processors, when determining the unit geographical coordinates, are configured to:
determine vectors associated with the unit geographical coordinates and the sets of community geographical coordinates,
wherein the unit geographical coordinates are determined based on the vectors.

13. The device of claim 12, wherein the vectors are determined based on:
distances and angles between the sets of community geographical coordinates and a geographical reference point, and
distances and angles between the reference pixel locations and the pixel location associated with the polygon.

14. The device of claim 8, wherein the community layout is an internal layout, and the community is a multi-unit building.

15. A non-transitory computer-readable medium storing instructions, the instructions comprising:
one or more instructions that, when executed by one or more processors, cause the one or more processors to:
receive a community image that depicts a community layout of a community;
process, using a computer vision model, the community image to identify a unit, of the community, that is depicted in the community image,
wherein the unit in the community image is identified based on identifying a unit identifier of the unit being depicted in the community image relative to a perimeter of the unit;
determine sets of community geographical coordinates for a set of reference locations of the community;
map the sets of community geographical coordinates to corresponding reference pixel locations of the community image;
determine, using a geographical information system, unit geographical coordinates of the unit based on the reference pixel locations and a pixel location associated with the perimeter;
determine, based on the unit geographical coordinates, a service qualification metric for the unit,
wherein the service qualification metric is associated with a capability of receiving a service within the unit; and
perform an action associated with the service qualification metric and the unit identifier,
wherein the one or more instructions, that cause the one or more processors to perform the action, cause the one or more processors to:
provide the service qualification metric to a user device that provided the community image,
provide, to a service management device, an indication of the service qualification metric and the unit identifier, or update a service coverage mapping to indicate the service coverage metric in association with the unit geographical coordinates and the unit identifier.

16. The non-transitory computer-readable medium of claim 15, wherein the community image is received in association with reference location information that identifies the sets of community geographical coordinates or the set of reference locations,
   wherein the one or more instructions, that cause the one or more processors to determine the sets of community geographical coordinates, cause the one or more processors to:
      determine the sets of community geographical coordinates based on the reference location information.

17. The non-transitory computer-readable medium of claim 15, wherein the one or more instructions, that cause the one or more processors to determine the sets of community geographical coordinates, cause the one or more processors to:
   process, using the computer vision model, the community image to identify the set of reference locations, wherein the set of reference locations includes at least two of:
      a street address of the community,
      a street address of a unit of the community,
      a street associated with the community, and
      an intersection of streets within the community; and
   determine, using the geographical information system, the sets of community geographical coordinates based on identifying the set of reference locations.

18. The non-transitory computer-readable medium of claim 15, wherein the one or more instructions, that cause the one or more processors to process the community image, cause the one or more processors to:
   use the computer vision model to identify a text string that corresponds to the unit identifier;
   use the computer vision model to identify a polygon that corresponds to the unit identifier,
      wherein the polygon is identified based on being depicted within a threshold distance of the text string;
   detect that the unit is depicted in the community image based on the text string and the polygon; and
   determine that the text string corresponds to the unit identifier and the polygon corresponds to the perimeter.

19. The non-transitory computer-readable medium of claim 15, wherein the one or more instructions, when executed by the one or more processors, further cause the one or more processors to:
   store the unit identifier in association with the unit geographical coordinates.

20. The non-transitory computer-readable medium of claim 15, wherein the one or more instructions, when executed by the one or more processors, further cause the one or more processors to:
   provide, to a user device that provided the community image, a request to verify unit information of the unit,
      wherein the request identifies at least one of the unit identifier or the perimeter;
   receive, from the user device, a response that includes verification information associated with the unit information; and
   train, based on the verification information, the computer vision model based on the verification information.

* * * * *